United States Patent
Freiheit et al.

(10) Patent No.: US 8,600,947 B1
(45) Date of Patent: Dec. 3, 2013

(54) SYSTEMS AND METHODS FOR PROVIDING BACKUP INTERFACES

(75) Inventors: Kirk Hartmann Freiheit, Lake Mary, FL (US); Gregory R. Dowers, II, Lake Mary, FL (US); Robert Santiago, Oviedo, FL (US); Jessica Rich, Santee, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/314,517

(22) Filed: Dec. 8, 2011

(51) Int. Cl.
G06F 7/00 (2006.01)
G06F 17/00 (2006.01)
G06F 15/16 (2006.01)

(52) U.S. Cl.
USPC .............................. 707/654; 707/634; 707/659

(58) Field of Classification Search
USPC .......................................... 707/654, 634, 659
See application file for complete search history.

(56) References Cited

U.S. PATENT DOCUMENTS

| | | | | |
|---|---|---|---|---|
| 7,363,359 B1 * | 4/2008 | Tripathy et al. | ............... | 707/202 |
| 7,937,546 B2 * | 5/2011 | Hiraiwa et al. | ............... | 707/659 |
| 2007/0100913 A1 * | 5/2007 | Sumner et al. | ................ | 707/204 |
| 2011/0041004 A1 * | 2/2011 | Miwa et al. | ....................... | 714/5 |

OTHER PUBLICATIONS

Theodore J. Kaiser IV et al.; Systems and Methods for Providing Backup Storage Interfaces; U.S. Appl. No. 13/314,557, filed Dec. 8, 2011.
Gregory R. Dowers II et al.; Systems and Methods for Navigating Backup Configurations; U.S. Appl. No. 13/314,538, filed Dec. 8, 2011.
Gregory R. Dowers, II, et al.; Systems and Methods for Displaying Backup-Status Information for Computing Resources; U.S. Appl. No. 13/356,114, filed Jan. 23, 2012.
Thomas Weaver, et al; Systems and Methods for Simultaneously Configuring Multiple Independent Backups; U.S. Appl. No. 13/358,245, filed Jan. 25, 2012.

* cited by examiner

Primary Examiner — Greta Robinson
Assistant Examiner — Brian E. Weinrich
(74) Attorney, Agent, or Firm — ALG Intellectual Property, LLC

(57) ABSTRACT

A computer-implemented method for providing backup interfaces may include (1) identifying a backup policy configured to back up a source system according to a backup configuration, (2) identifying a request to display the backup policy within a graphical user interface, and in response to the request, (3) portraying the backup policy within the graphical user interface as a flow diagram, the flow diagram including (i) a first box representing the source system, the first box displaying an identifier of the source system, (ii) a second box representing a backup stage of the backup policy, the second box displaying an identifier of the backup stage, and (iii) a directed edge connecting the first box and the second box, the directed edge indicating a sequence beginning with the first box and progressing to the second box. Various other methods, systems, and computer-readable media are also disclosed.

20 Claims, 10 Drawing Sheets

SYSTEMS AND METHODS FOR PROVIDING BACKUP INTERFACES

BACKGROUND

In the digital age, organizations increasingly rely on digitally-stored data. To protect against data loss, an organization may use one or more backup systems to back up important data.

Due to increasingly complex information technology infrastructures, an organization may create backups from a variety of sources, using a variety of methods, and according to a variety of different schedules. In some cases, an organization may create a backup as a part of a larger multi-stage backup process, where the backup may in turn be duplicated, virtualized, archived, etc. Furthermore, one or more of these backup stages may occur in parallel with other backup stages.

Unfortunately, managing complex multi-stage backups using traditional backup systems may be difficult and time-consuming for an administrator. For example, the administrator may have to navigate back and forth through various windows, tabs, and/or menus of a graphical interface to configure each stage of the larger scheme. Furthermore, the administrator may have to ensure various configuration parameters of consecutive stages match and/or are compatible. Even after the time and effort spent by an administrator, the confusion and discontinuities caused by using a traditional backup system to configure a complex multi-stage backup operation may result in human error. Accordingly, the instant disclosure identifies and addresses a need for additional and improved systems and methods for providing backup interfaces.

SUMMARY

As will be described in greater detail below, the instant disclosure generally relates to systems and methods for providing backup interfaces by displaying multi-stage backup policies in flow diagrams and, in some examples, allowing users to dynamically edit the backup policies via the flow diagrams (e.g., by adding and/or removing backup stages from the flow diagrams and/or editing configuration details within the backup stages of the flow diagrams). In one example, a computer-implemented method for providing backup interfaces may include (1) identifying a backup policy configured to back up a source system according to a backup configuration, (2) identifying a request to display the backup policy within a graphical user interface, and in response to the request, (3) portraying the backup policy within the graphical user interface as a flow diagram, the flow diagram including (i) a first box representing the source system, the first box displaying an identifier of the source system, (ii) a second box representing a backup stage of the backup policy, the second box displaying an identifier of the backup stage, and (iii) a directed edge connecting the first box and the second box, the directed edge indicating a sequence beginning with the first box and progressing to the second box.

In some examples, the first box may also display at least one identified selection of data to back up from the source system according to the backup policy. Additionally or alternatively, the first box may include at least one interface element for modifying a selection of data to back up from the source system within the backup policy within the first box.

In some examples, the second box may also display at least one configuration detail of the backup stage within the backup policy, the configuration detail including a storage target of the backup stage and/or a schedule of the backup stage. Additionally or alternatively, the second box may include at least one interface element for modifying at least one configuration detail of the backup stage within the second box. In some examples, the second box may include an interface element for adding an additional backup stage to the backup policy, the additional backup stage being applied to data created at the backup stage. In these examples, the computer-implemented method may also include (1) receiving an input via the interface element and, in response to the input, (2) adding the additional backup stage to the backup policy and (3) modifying the flow diagram to include (i) a third box representing the additional backup stage and (ii) an additional directed edge connecting the second box and the third box, the additional directed edge indicating a sequence beginning with the second box and progressing to the third box; and (4) displaying the modified flow diagram within the graphical user interface.

In some embodiments, the directed edge may include an arrow pointing from the first box to the second box. In some examples, the flow diagram may also include (1) a third box representing an additional backup stage of the backup policy, the additional backup stage being applied to the source system and (2) an additional directed edge connecting the first box and the third box, the additional directed edge indicating a sequence beginning with the first box and progressing to the third box. Additionally or alternatively, the flow diagram may also include (1) a third box representing an additional backup stage of the backup policy, the additional backup stage being applied to data created at the backup stage and (2) an additional directed edge connecting the second box and the third box, the additional directed edge indicating a sequence beginning with the second box and progressing to the third box.

In one embodiment, a system for implementing the above-described method may include an identification module programmed to (1) identify a backup policy configured to back up a source system according to a backup configuration and (2) identify a request to display the backup policy within a graphical user interface. The system may also include an interface module programmed to, in response to the request, portray the backup policy within the graphical user interface as a flow diagram, the flow diagram including (1) a first box representing the source system, the first box displaying an identifier of the source system, (2) a second box representing a backup stage of the backup policy, the second box displaying an identifier of the backup stage, and (3) a directed edge connecting the first box and the second box, the directed edge indicating a sequence beginning with the first box and progressing to the second box. The system may additionally include at least one processor configured to execute the identification module and the interface module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a backup policy configured to back up a source system according to a backup configuration, (2) identify a request to display the backup policy within a graphical user interface, and in response to the request, (3) portray the backup policy within the graphical user interface as a flow diagram, the flow diagram including (i) a first box representing the source system, the first box displaying an identifier of the source system, (ii) a second box representing a backup stage of the backup policy, the second box displaying an identifier of the backup stage, and (iii) a directed edge connecting the first box and the second box, the directed edge indicating a sequence beginning with the first box and progressing to the second box.

As will be explained in greater detail below, by displaying multi-stage backup policies in flow diagrams, the systems and methods described herein may enable an administrator to view one or more stages of a backup policy at once in a visually organized manner. Furthermore, in some examples, by allowing administrators to dynamically edit the backup policies via the flow diagrams (e.g., by adding and/or removing backup stages from the flow diagrams and/or editing configuration details within the backup stages of the flow diagrams), these systems and methods may reduce the time and effort that may otherwise be spent in navigating back and forth through a backup system graphical user interface and may also thereby reduce human error involved in creating, modifying, and/or assessing the state of backup policies.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
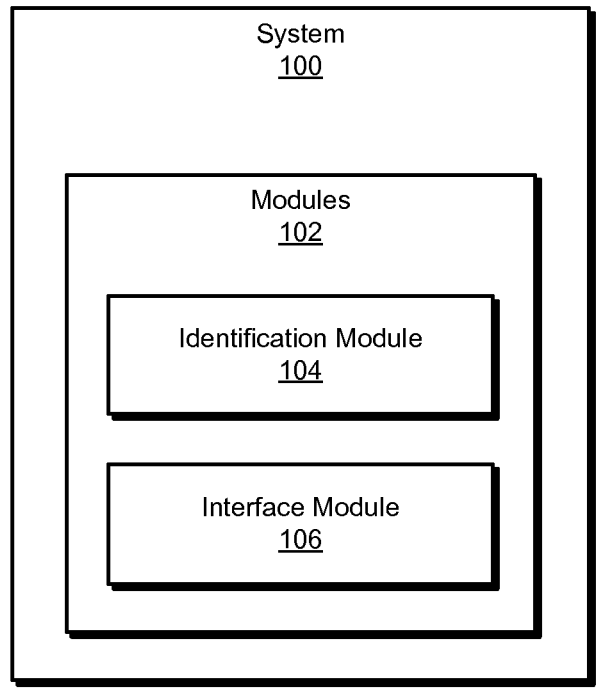
FIG. 1 is a block diagram of an exemplary system for providing backup interfaces.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
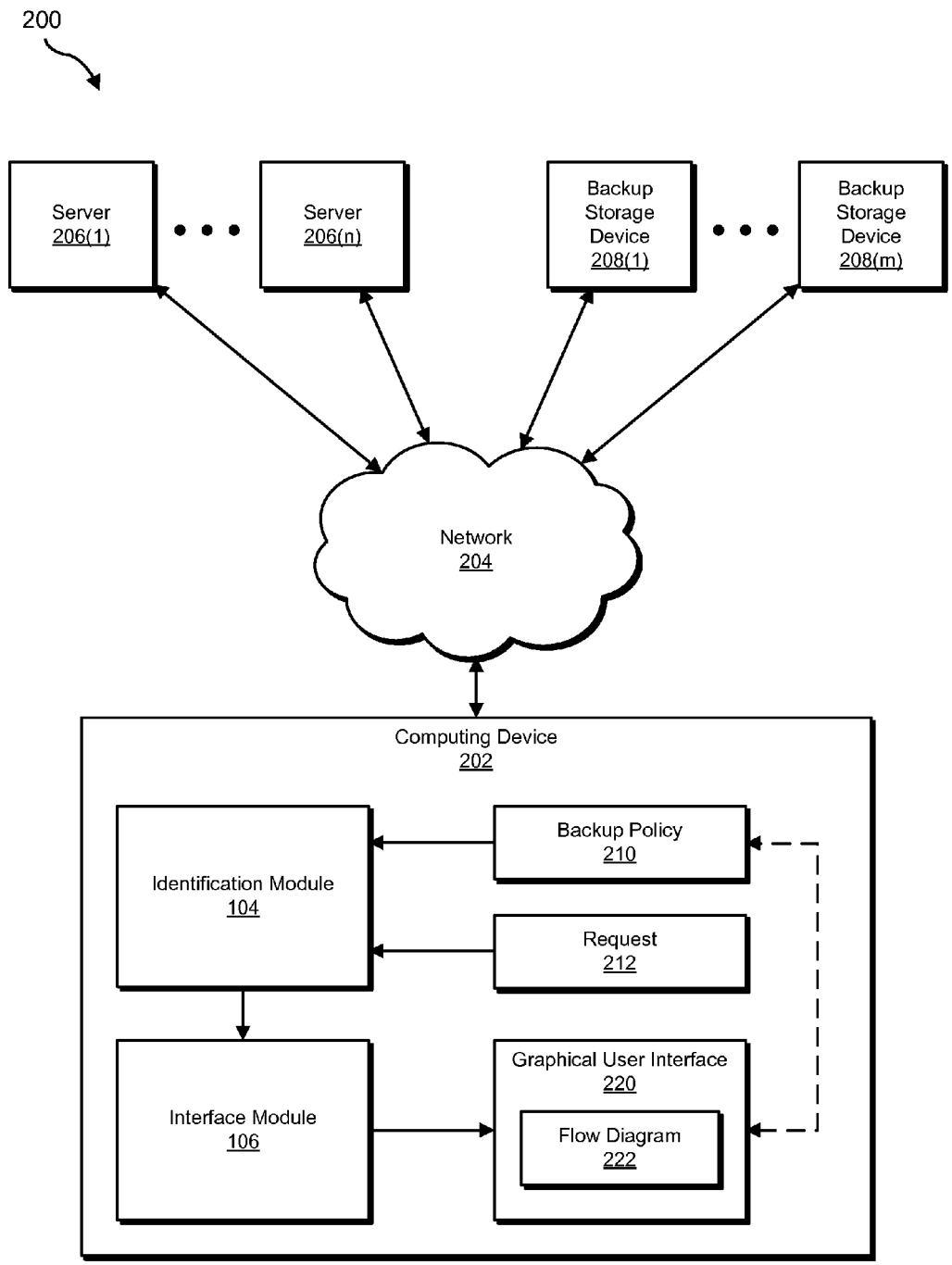
FIG. 2 is a block diagram of an exemplary system for providing backup interfaces.

The following will provide, with reference to FIGS. 1-2, detailed descriptions of exemplary systems for providing backup interfaces. Detailed descriptions of corresponding computer-implemented methods will also be provided in connection with FIG. 3. Detailed descriptions of exemplary graphical user interfaces will be provided in connection with FIGS. 4-8. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for providing backup interfaces. As illustrated in this figure, exemplary system 100 may include one or more modules 102 for performing one or more tasks. For example, and as will be explained in greater detail below, exemplary system 100 may include an identification module 104 programmed to (1) identify a backup policy configured to back up a source system according to a backup configuration and (2) identify a request to display the backup policy within a graphical user interface.

In addition, and as will be described in greater detail below, exemplary system 100 may include an interface module 106 programmed to, in response to the request, portray the backup policy within the graphical user interface as a flow diagram, the flow diagram including (1) a first box representing the source system, the first box displaying an identifier of the source system, (2) a second box representing a backup stage of the backup policy, the second box displaying an identifier of the backup stage, and (3) a directed edge connecting the first box and the second box, the directed edge indicating a sequence beginning with the first box and progressing to the second box. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, servers 206(1)-(n), and/or backup storage devices 208(1)-(m)), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with servers 206(1)-(n) and backup storage devices 208(1)-(m) via a network 204. For example, computing device 202 may represent a backup central administration server used to configure backup policies for backing up data from one or more of servers 206(1)-(n) to one or more of storage devices 208(1)-(m).

In one embodiment, one or more of modules 102 from FIG. 1 may, when executed by at least one processor of computing device 202, facilitate computing device 202 in providing backup interfaces. For example, and as will be described in greater detail below, one or more of modules 102 may cause computing device 202 to (1) identify a backup policy (e.g., a backup policy 210) configured to back up a source system (e.g., server 206(1)) according to a backup configuration, (2) identify a request (e.g., a request 212) to display the backup policy within a graphical user interface (e.g., a graphical user interface 220), and in response to the request, (3) portray the backup policy within the graphical user interface as a flow diagram (e.g., portray backup policy 210 within graphical user interface 220 as a flow diagram 222), the flow diagram including (i) a first box representing the source system, the first box displaying an identifier of the source system, (ii) a second box representing a backup stage of the backup policy, the second box displaying an identifier of the backup stage, and (iii) a directed edge connecting the first box and the second box, the directed edge indicating a sequence beginning with the first box and progressing to the second box.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 910 in FIG. 9, or any other suitable computing device.

Servers 206(1)-(n) generally represent any type or form of computing devices that are capable of storing, managing, and/or processing data. Examples of servers 206(1)-(n) include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 1000 in FIG. 10, or the like. Network 204 may facilitate communication or data transfer using wireless or wired connections. In one embodiment, network 204 may facilitate communication between computing device 202 and server 206.

Backup storage devices 208(1)-(m) may each represent portions of individual databases or storage devices or of pluralities of databases or storage devices. For example, one or more of backup storage devices 208(1)-(m) may represent a portion of servers 206(1)-(n) in FIG. 2, computing system 910 in FIG. 9, and/or portions of exemplary network architecture 1000 in FIG. 10. Alternatively, backup storage devices 208(1)-(m) in FIG. 1 may represent one or more physically separate devices capable of being accessed by a computing device, such as servers 206(1)-(n) in FIG. 2, computing system 910 in FIG. 9, and/or portions of exemplary network architecture 1000 in FIG. 10.

Figure 3:
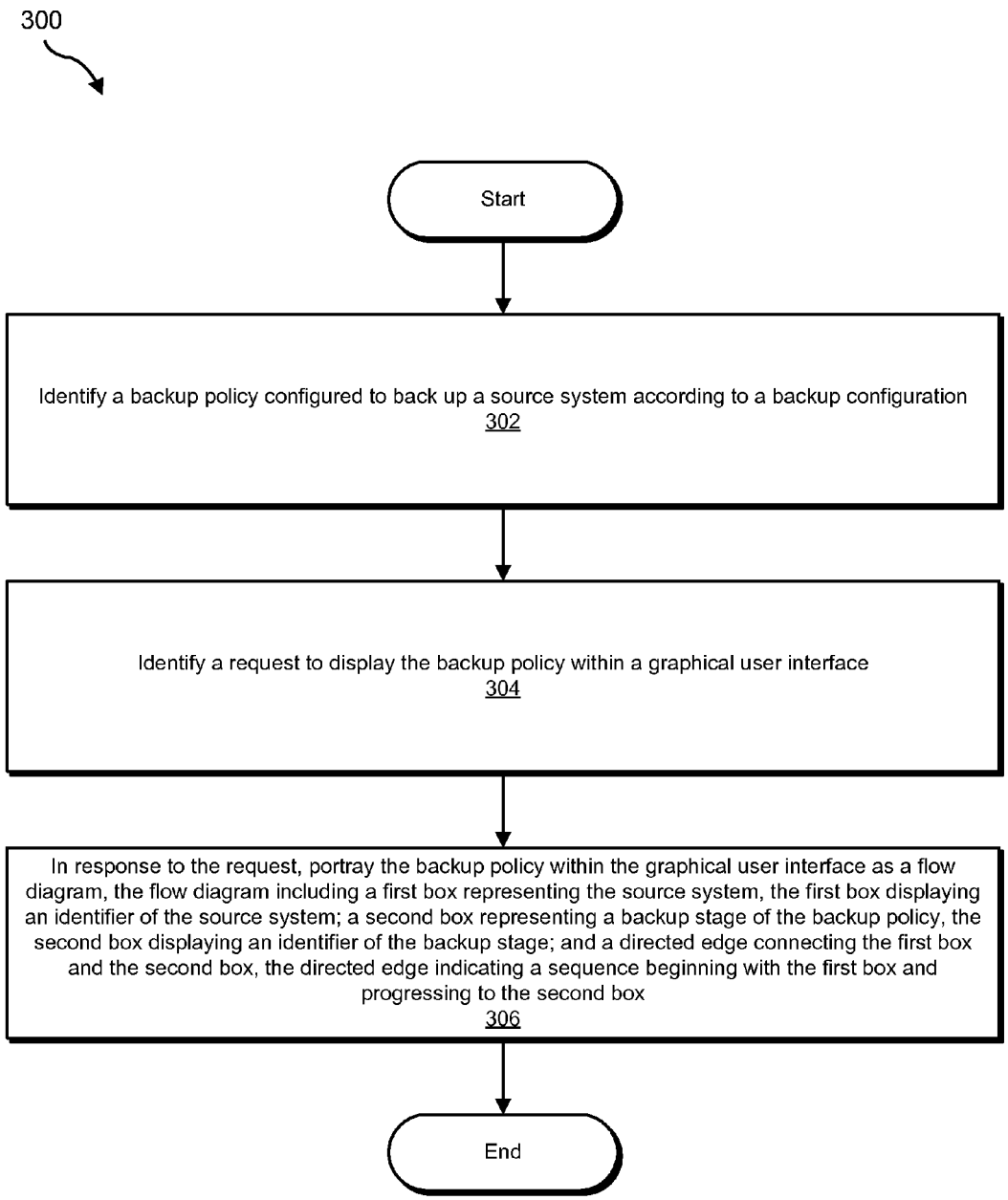
FIG. 3 is a flow diagram of an exemplary method for providing backup interfaces.

FIG. 3 is a flow diagram of an exemplary computer-implemented method 300 for providing backup interfaces. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of exemplary network architecture 1000 in FIG. 10.

As illustrated in FIG. 3, at step 302 one or more of the systems described herein may identify a backup policy configured to back up a source system according to a backup configuration. For example, at step 302 identification module 104 may, as part of computing device 202 in FIG. 2, identify backup policy 210 configured to back up server 206(1).

As used herein, the phrase "backup policy" may refer to any collection of configurations, scripts, jobs, and/or specifications for performing one or more backup operations. As used herein, the phrase "backup operation" may include any operation for backing up, protecting, transferring, and/or replicating data. Examples of backup operations include, without limitation, backing up data (e.g., to a disk, a tape, a deduplication data store, etc.), duplicating data (e.g., to a disk, a tape, etc.), archiving data, migrating data, creating a virtual copy of a system, etc. As used herein, the phrase "source system" may refer to any system from which data is retrieved and/or for which data is protected in a backup operation.

Identification module 104 may identify the backup policy in any of a variety of contexts. For example, identification module 104 may identify the backup policy by receiving input from a graphical user interface selecting the backup policy. Additionally or alternatively, identification module 104 may identify the backup policy by receiving input from a graphical user interface selecting a system implicated in the backup policy (e.g., the source system). In some examples, identification module 104 may identify the backup policy after the backup policy has been created and/or while the backup policy is in effect. Additionally or alternatively, identification module 104 may identify the backup policy when the backup policy is first created (e.g., by creating the backup policy) and/or while the backup policy is still tentative.

Figure 4:
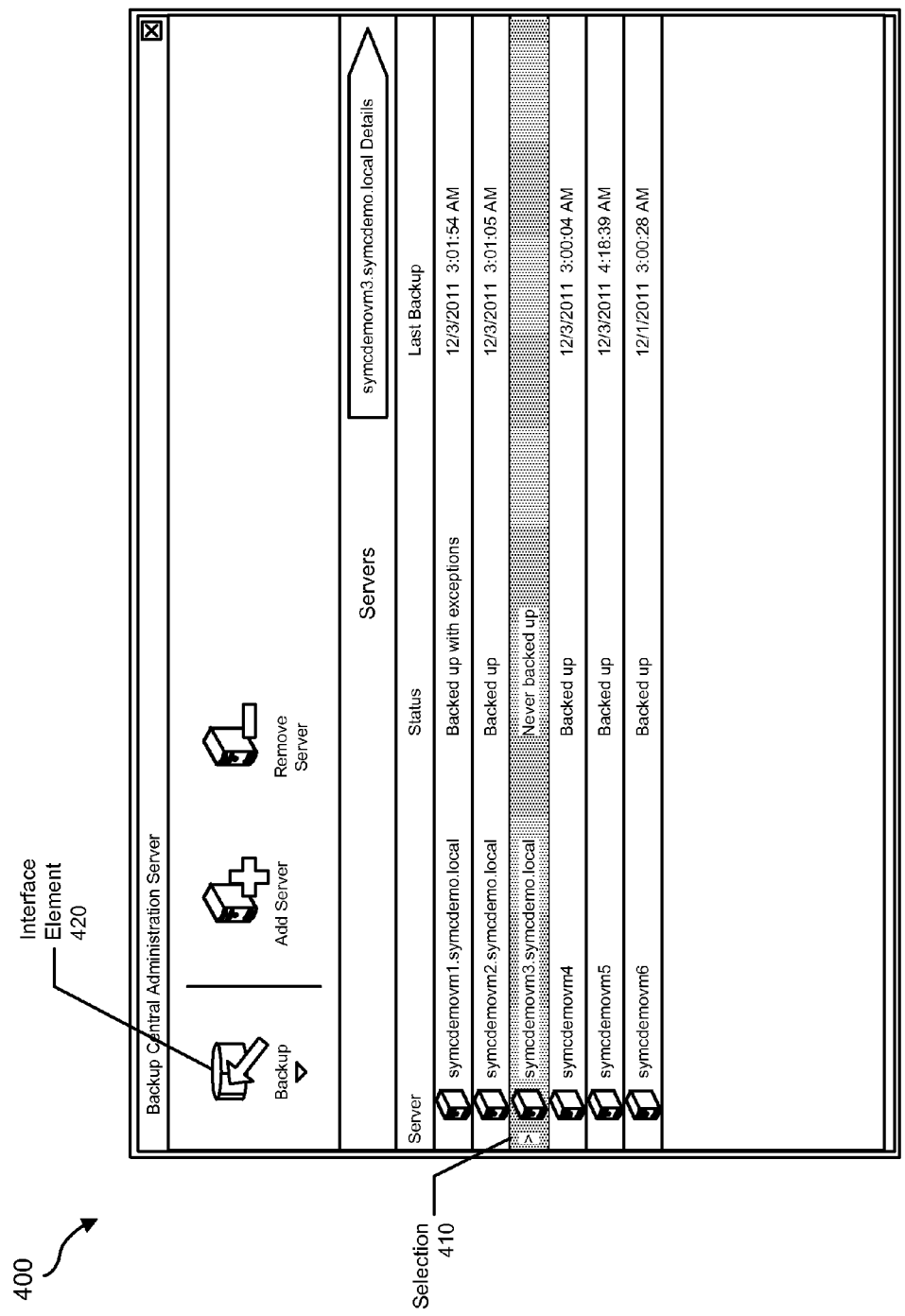
FIG. 4 is a diagram of an exemplary graphical user interface for providing backup interfaces.

FIG. 4 is an illustration of an exemplary graphical user interface 400. Using FIG. 4 as an example, graphical user interface 400 may allow an administrator to select a server for backup. As shown in FIG. 4, an administrator may make a selection 410 of a server for backup (e.g., a source system). In some examples, the administrator may then interact with an interface element 420 (by, e.g., clicking a backup button for configuring a backup for the server selected in selection 410).

Figure 5:
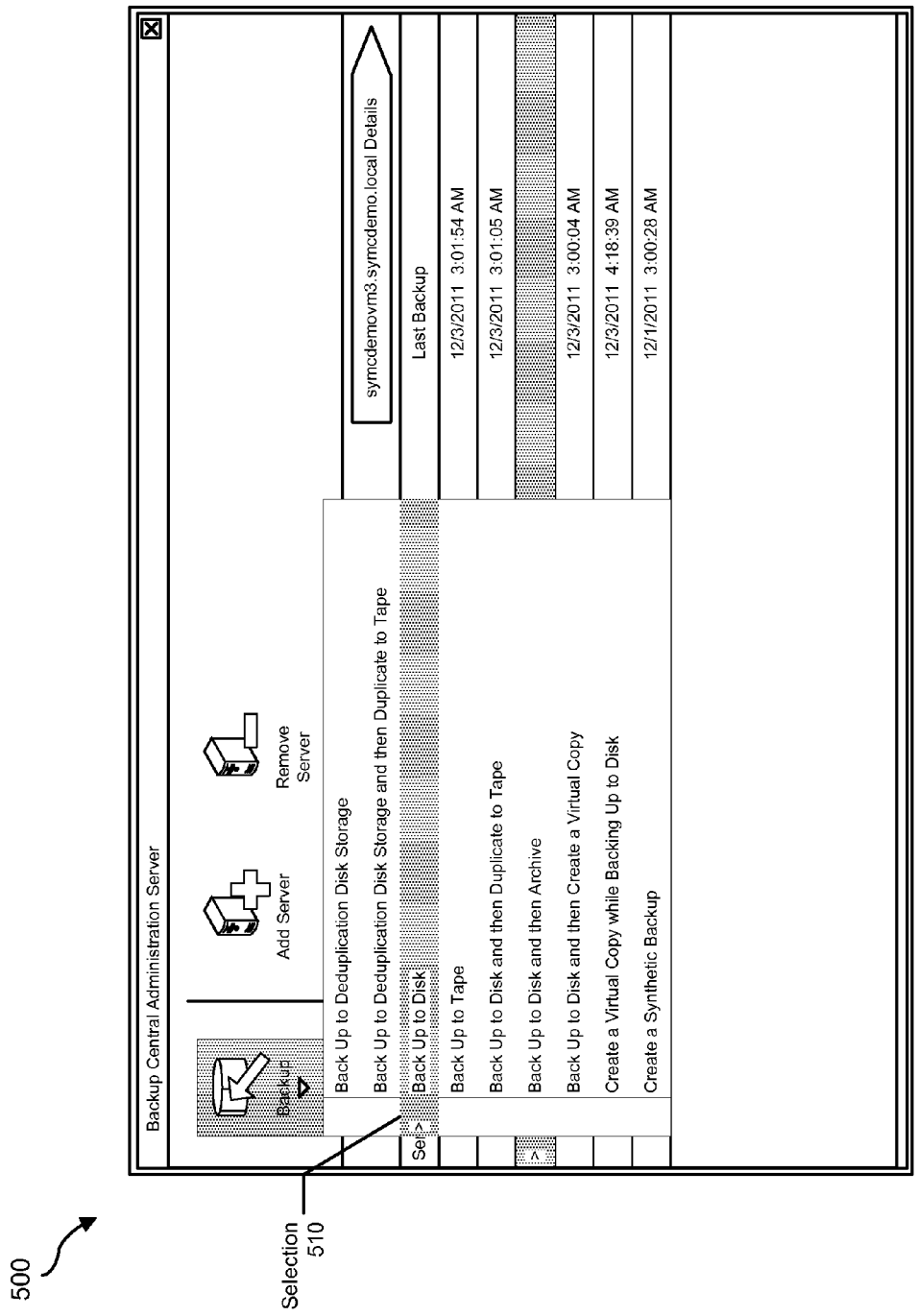
FIG. 5 is a diagram of an exemplary graphical user interface for providing backup interfaces.

FIG. 5 is an illustration of an exemplary graphical user interface 500. As shown in FIG. 5, graphical user interface 500 may provide a pull-down menu (e.g., after the administrator interacted with interface element 420 in FIG. 4) to select an initial backup configuration for the backup policy. In some examples, the administrator may select a selection 510 (e.g., to back up the server to disk). Using FIGS. 4 and 5 as an example, at step 302 identification 104 may identify the backup policy configured to back up the source system according to the backup configuration by identifying a tentative backup policy created by selecting selection 410 (e.g., to select the source system) and selecting selection 510 (e.g., to select the backup configuration for the backup policy).

Returning to FIG. 3, at step 304 one or more of the systems described herein may identify a request to display the backup policy within a graphical user interface. For example, at step 304 identification module 104 may, as part of computing device 202 in FIG. 2, identify request 212 to display backup policy 210 within graphical user interface 220.

As used herein, the phrase "graphical user interface" may refer to any interface that may allow a user to interact with a computing system. In some examples, the graphical user interface may include an interface for a backup central administration server.

Identification module 104 may identify the request in any of a variety of contexts. For example, identification module 104 may identify the request by receiving a communication from and/or within the graphical user interface that the backup policy has been selected. Additionally or alternatively, identification module 104 may identify the request by receiving a communication from and/or within the graphical user interface that a system implicated in the backup policy (e.g., the source system) has been selected. Using FIG. 5 as an example, by selecting selection 510 an administrator may generate a request to create a tentative backup policy and to display the tentative backup policy.

Returning to FIG. 3, at step 306 one or more of the systems described herein may portray the backup policy within the graphical user interface as a flow diagram. The flow diagram may include (1) a first box representing the source system, the first box displaying an identifier of the source system, (2) a second box representing a backup stage of the backup policy, the second box displaying an identifier of the backup stage, and (3) a directed edge connecting the first box and the second box, the directed edge indicating a sequence beginning with the first box and progressing to the second box. For example, at step 306 interface module 106 may, as part of computing device 202 in FIG. 2, portray backup policy 210 within graphical user interface 220 as a flow diagram 222.

As used herein, the phrase "flow diagram" may refer to any diagram and/or illustration of one or more interconnected elements. In some examples, the flow diagram may illustrate a sequence and/or one or more dependencies between the interconnected elements.

As used herein, the term "box" may refer to any distinct element of a flow diagram. In some examples, the term "box" may refer to a rectilinear and/or rectangular figure within a flow diagram. Additionally or alternatively, the term "box" may refer to a vertex, node, and/or interconnection point within the flow diagram. In some examples, the term "box" may refer to a figure with a distinct outline. Alternatively, the term "box" may refer to an area otherwise portrayed as distinct, whether by coloring, by shading, by clustering of elements within the box, by the distance of the box from one or more other boxes, by one or more elements (e.g., edges connecting to the box) intervening between the box and one or more other boxes, and/or by the alignment of the box within the flow diagram and/or with respect to one or more other elements within the flow diagram.

The identifier of the source system may include any of a variety of information. In some examples, the identifier of the source system may include a name of the source system. Additionally or alternatively, the identifier of the source system may include an icon representing the source system (e.g., according to one or more characteristics of the source system). In some examples, the identifier may include a network address of the source system.

The first box may include any of a variety of elements and/or information. For example, the first box may display at least one identified selection of data to back up from the source system according to the backup policy. For example, the first box may display one or more volumes selected for backup (in full or in part), state information of the source system selected for backup, database instances selected for backup, etc. In some examples, the first box may also display what data of the source system has not been selected for backup according to the backup policy.

Figure 6:
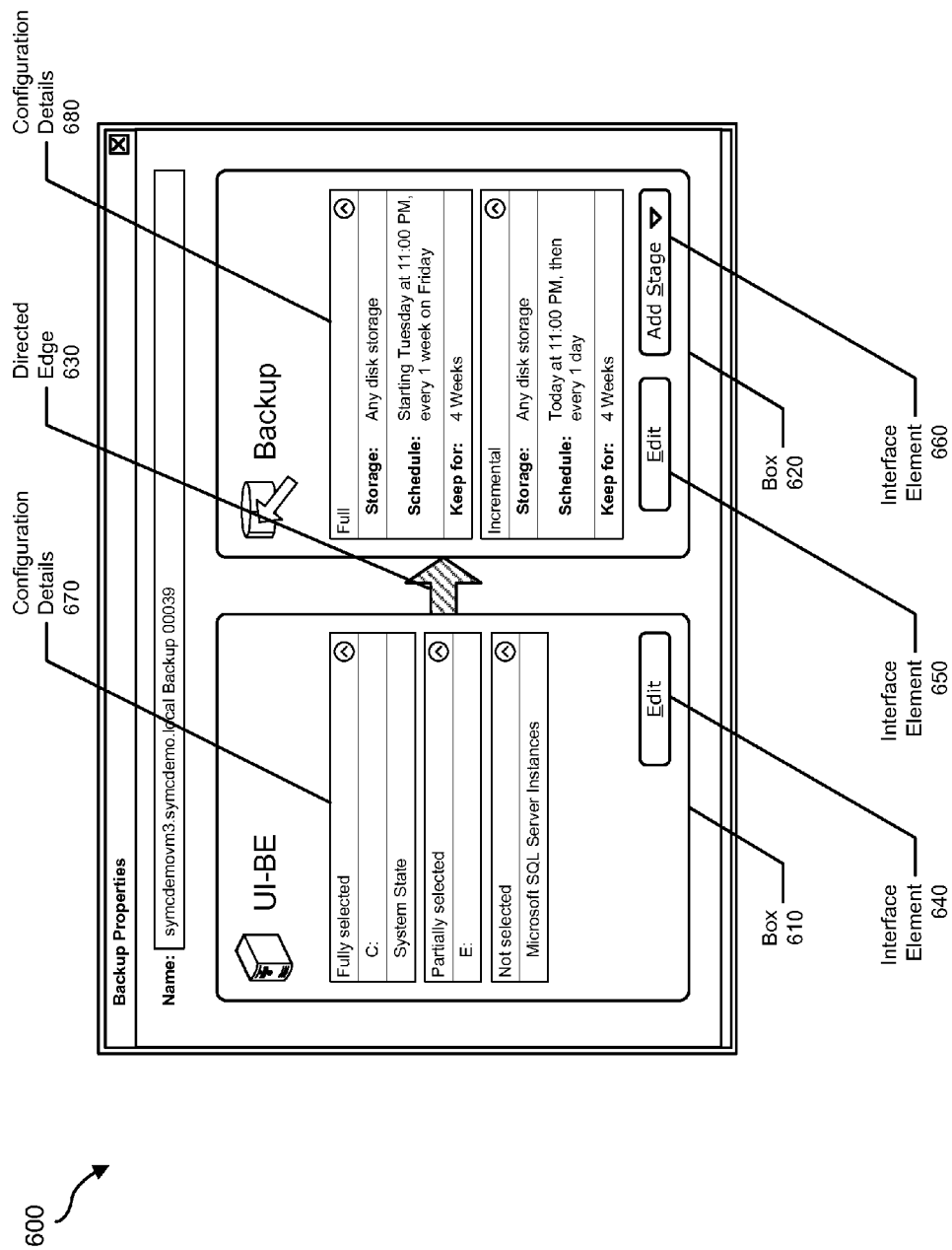
FIG. 6 is a diagram of an exemplary graphical user interface for providing backup interfaces.

FIG. 6 is an illustration of an exemplary graphical user interface 600. As shown in FIG. 6, graphical user interface 600 may include a box 610. Using FIG. 6 as an example, box 610 may include configuration details 670. In one example, configuration details 670 may show that the whole of a volume "C:" has been selected for backup, that the state of the source system has been selected for backup, and that elements of a volume "E:" have been selected for backup. Configuration details 670 may also show that one or more database instances associated with the source system have not been selected for backup.

In some examples, the first box may also include at least one interface element for modifying a selection of data to back up from the source system within the backup policy within the first box. As used herein, the phrase "interface element" may refer to any element which may trigger an action within an interface and/or which may allow editing within an interface. For example, the interface element may include a button configured to open a configuration editor. Additionally or alternatively, the interface element may include a button for unlocking inline editing of the selection of data (e.g., enabling the manipulation of one or more interface elements used to display the data selected for backup). In some examples, the interface element may include an interface element used to display the data selected for backup (e.g., a text box, a pull-down menu, a checkbox, a radio button, etc.). Using FIG. 6 as an example, graphical user interface 600 may include an interface element 640 (e.g., an "edit" button) for modifying the selection of data (e.g., configuration details 670) to back up from the source system.

As used herein, the phrase "backup stage" may refer to any stage within a backup policy at which a backup operation (e.g., as described above) is performed. For example, a backup stage may include backing up data (e.g., to a disk, a tape, a deduplication data store, etc.), duplicating data (e.g., to a disk, a tape, etc.), archiving data, migrating data, creating a virtual copy of a system, etc. The identifier of the backup stage may include any of a variety of information. In some examples, the identifier of the backup stage may include a name of a backup operation performed at the backup stage. Additionally or alternatively, the identifier of the backup stage may include an icon representing the backup operation performed at the backup stage. Using FIG. 6 as an example, graphical user interface 600 may include a box 620. As shown in FIG. 6, box 620 may include an icon and text identifying box 620 as representing a backup.

In some examples, the second box may also display at least one configuration detail of the backup stage within the backup policy. For example, the configuration detail may include a storage target of the backup stage and/or a schedule of the backup stage. In this example, the storage target may identify and/or represent a location at which the data retrieved from the source system for a backup operation defined within the backup policy (e.g., and represented by the second box) will be stored. Likewise, the schedule may identify and/or represent one or more times (e.g., defined by times specified on an individual and/or periodic basis and/or defined by one or more events) at which a backup operation corresponding to the backup stage represented by the second box will occur. In some examples, the configuration detail may also include an expiration of backup data generated at the backup stage. Using FIG. 6 as an example, box 620 may include configuration details 680. As shown in FIG. 6, configuration details 680 may specify that the backup stage represented by box 620 may include a recurring weekly full backup that uses any available disk storage and is preserved for four weeks. Configuration details 680 may also specify that the backup stage represented by box 620 may include a recurring daily backup that uses any available disk storage and is preserved for four weeks.

In some examples, the second box may include at least one interface element for modifying at least one configuration detail of the backup stage within the second box. Using FIG. 6 as an example, box 620 may include an interface element 650 (e.g., an edit button) to enable the editing of configuration details 680 (e.g., inline or in a separate window).

As used herein, the phrase "directed edge" may refer to any edge, connector, pointer, and/or visual representation of a flow, transition, and/or relationship between boxes. For example, the directed edge may include an arrow pointing from the first box to the second box. In some examples, the directed edge may include a distinct graphic and/or icon. Additionally or alternatively, the directed edge may include a visual indicator formed by negative space and/or alignment of two or more boxes. For example, the directed edge may include an implicit connection and flow between two boxes that are horizontally or vertically aligned but have no intervening icons. In this example, the directed edge may indicate the sequence based on the relative positions of the boxes based on convention. For example, two boxes may be horizontally aligned and the directed edge may include the horizontal alignment. In this case, the horizontal alignment may indicate a sequence beginning with the left-side box and progressing to the right-side box. Alternatively, two boxes may be vertically aligned and the directed edge may include the vertical alignment. In this case, the vertical alignment may indicate a sequence beginning with the upper box and progressing to the lower box. Using FIG. 6 as an example, graphical user interface 600 may include a directed edge 630 (e.g., an arrow) connecting box 610 and box 620 and indicating a sequence beginning with box 610 and progressing to box 620.

In some examples, the second box may include an interface element for adding an additional backup stage to the backup policy, the additional backup stage being applied to data created at the backup stage. Using FIG. 6 as an example, box 620 may include an interface element 660 (e.g., a button-based pull-down menu) for adding an additional backup stage to the backup policy that depends on the backup stage represented by box 620.

In some examples, one or more systems described herein (e.g., interface module 106) may handle input to the interface element for adding the additional backup stage. For example, interface module 106 may receive an input via the interface element. Interface module 106 may then, in response to the input, add the additional backup stage to the backup policy. Interface module 106 may also modify the flow diagram to include a third box representing an additional backup stage of the backup policy, the additional backup stage being applied to data created at the backup stage. Interface module 106 may additionally modify the flow diagram to include an additional directed edge connecting the second box and the third box, the additional directed edge indicating a sequence beginning with the second box and progressing to the third box. Interface module may also display the modified flow diagram within the graphical user interface.

Figure 7:
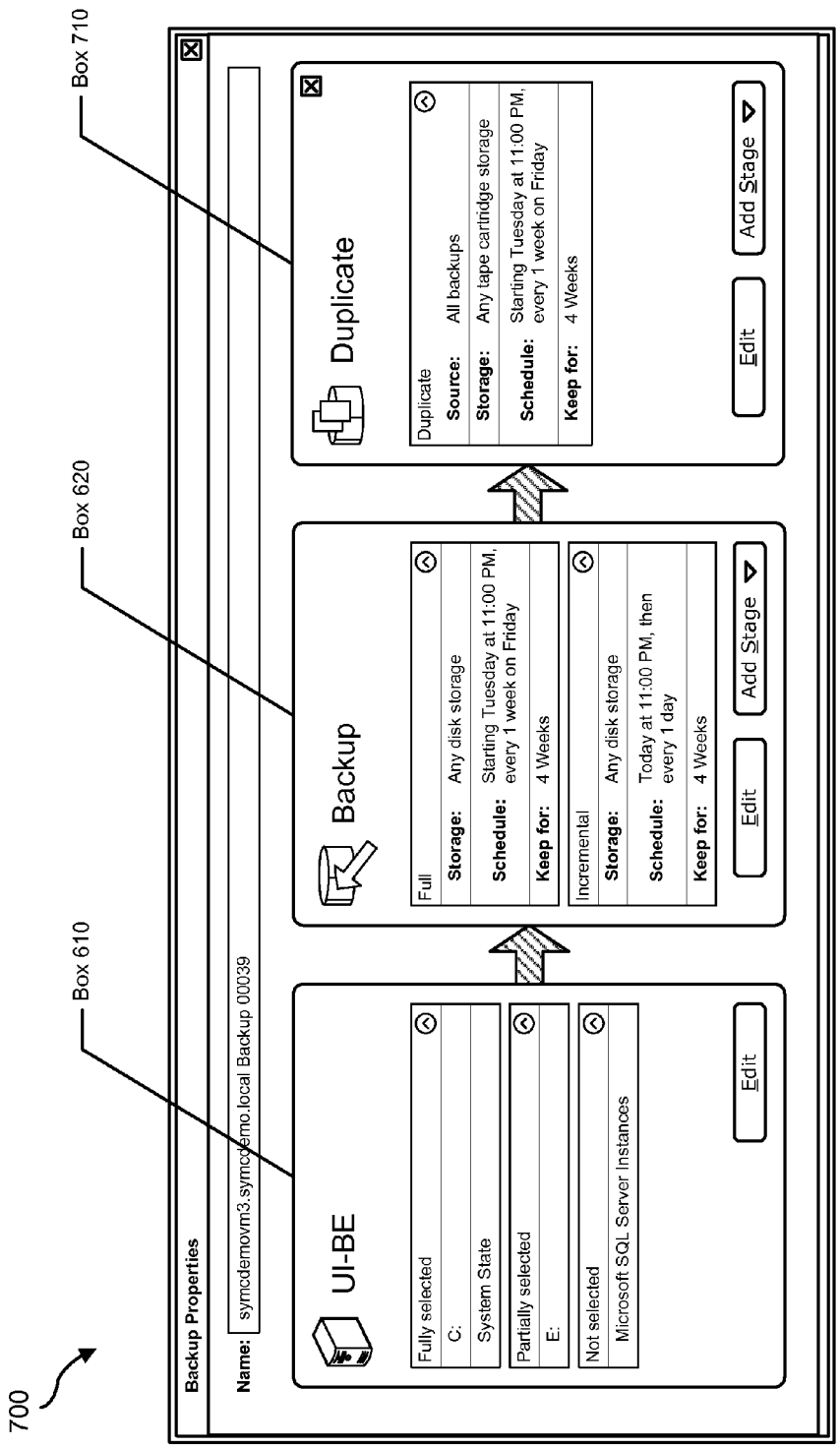
FIG. 7 is a diagram of an exemplary graphical user interface for providing backup interfaces.

FIG. 7 is an illustration of an exemplary graphical user interface 700. As shown in FIG. 7, graphical user interface 700 may include box 610 and box 620 from FIG. 6. Graphical user interface 700 may also include a box 710. Box 710 may have been created by an administrator using interface element 660 to select a new backup stage (e.g., a duplication operation) to depend from box 620. Accordingly, the backup policy may, as represented by graphical user interface 700, now include a backup performed from the source system and a duplication performed from the backup.

In some examples, by creating and/or modifying a backup stage, interface module 106 may also automatically modify the configuration of related backup stages. For example, an administrator may modify box 620 to specify a particular storage device for the full backup. Interface module 106 may then automatically modify the source of the duplication operation represented in box 710 to duplicate from the specified source. By automatically configuring portions of a backup stage based on changes to a related backup stage, the systems and methods described herein may make modifications to backup policies more intuitive and more efficient while reducing chances for human error. Furthermore, by allowing an administrator to specify elements of backup configuration at a logical level (e.g., specifying storage as "any disk storage,"), these systems and methods may use the high-level configuration decisions of the administrator to automatically populate underlying configuration details of one or more backup stages.

In some examples, the flow diagram may also include a third box representing an additional backup stage of the backup policy, the additional backup stage being applied to the source system and an additional directed edge connecting the first box and the third box, the additional directed edge indicating a sequence beginning with the first box and progressing to the third box. For example, the backup policy may be configured to backup and archive the same data from the source system. Accordingly, the flow diagram may show both a backup stage implementing a backup and a backup stage implementing an archive operation depending on the source system.

In some examples, the flow diagram may also include a third box representing an additional backup stage of the backup policy, the additional backup stage being applied to data created at the backup stage and an additional directed edge connecting the second box and the third box, the additional directed edge indicating a sequence beginning with the second box and progressing to the third box.

Figure 8:
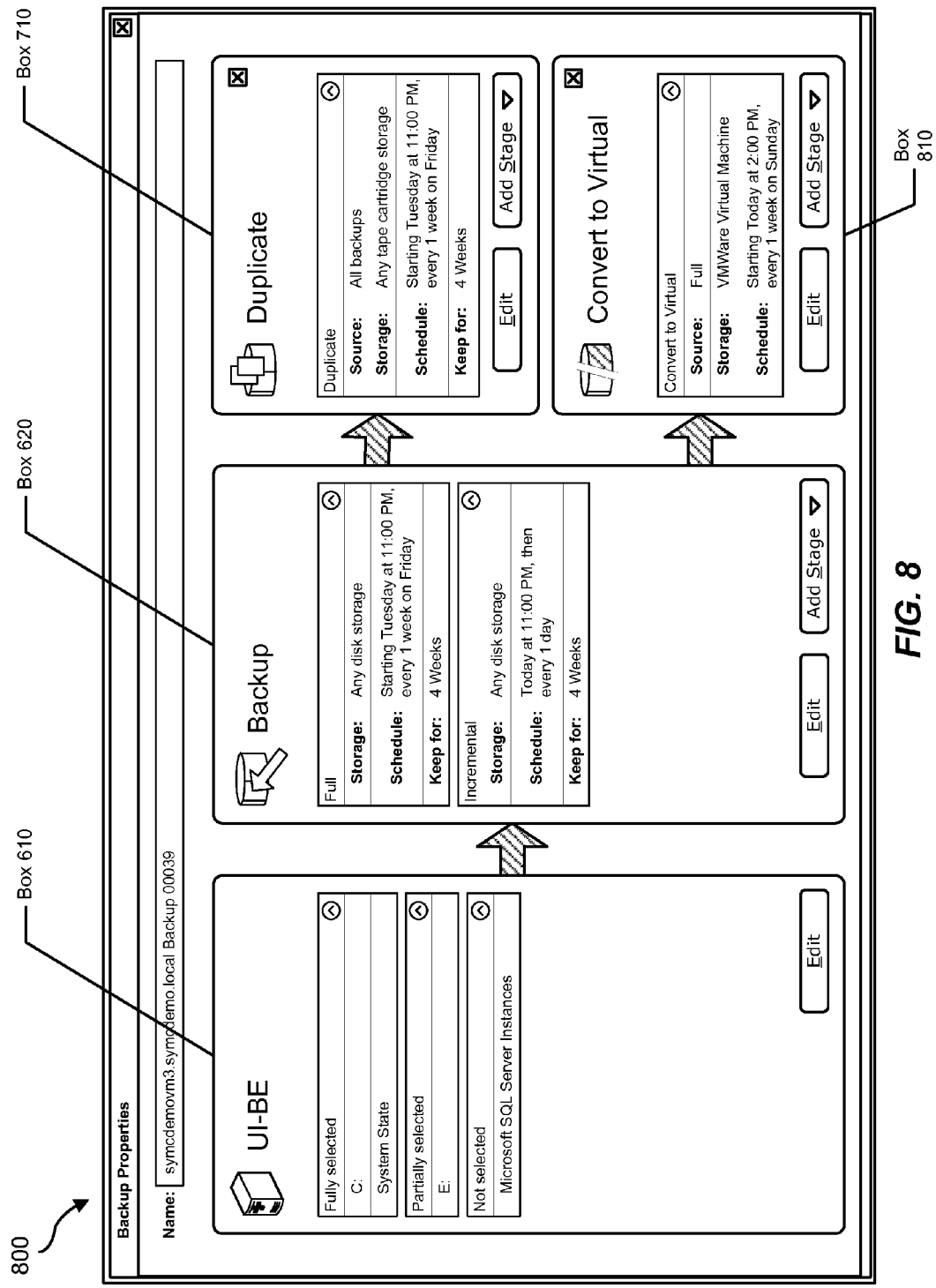
FIG. 8 is a diagram of an exemplary graphical user interface for providing backup interfaces.

FIG. 8 is an illustration of an exemplary graphical user interface 800. As shown in FIG. 8, graphical user interface 800 may include box 610 and box 620 from FIG. 6, box 710 from FIG. 7, and a box 810. Both box 710 and box 810 may depend on box 620. For example, the data backed up by a backup operation at a stage represented by box 620 may be used both for duplication as shown by box 710 and may be stored in a virtual machine as shown in box 810.

While the illustrations discussed herein may show backup policies with three or four stages, the backup policy may include any number of stages and the flow diagram may include any number of boxes to represent the stages. Using FIG. 8 as an example, an administrator may add an archiving stage depending on box 610. Additionally or alternatively, the administrator may add another duplication stage following box 710.

In some examples, interface module 106 may create the flow diagram within the graphical user interface to allow an administrator to drag a box from depending on one box to depending on another box. In this manner an administrator may dynamically manipulate ordering and dependencies within the flow diagram. In some examples, an administrator may delete a box using one or more interface elements. In at least one example, by deleting a box from the flow diagram, each box following the box may also be deleted. In some examples, these changes may alter the backup policy to reflect the new state of the flow diagram. In some examples, changes to the backup policy may be instantly made according to changes in the flow diagram. Additionally or alternatively, changes to the backup policy may be committed using an interface element within the graphical user interface.

As explained above, by displaying multi-stage backup policies in flow diagrams, the systems and methods described herein may enable an administrator to view one or more stages of a backup policy at once in a visually organized manner. Furthermore, in some examples, by allowing administrators to dynamically edit the backup policies via the flow diagrams (e.g., by adding and/or removing backup stages from the flow diagrams and/or editing configuration details within the backup stages of the flow diagrams), these systems and methods may reduce the time and effort that may otherwise be spent in navigating back and forth through a backup system graphical user interface and may also thereby reduce human error involved in creating, modifying, and/or assessing the state of backup policies.

Figure 9:
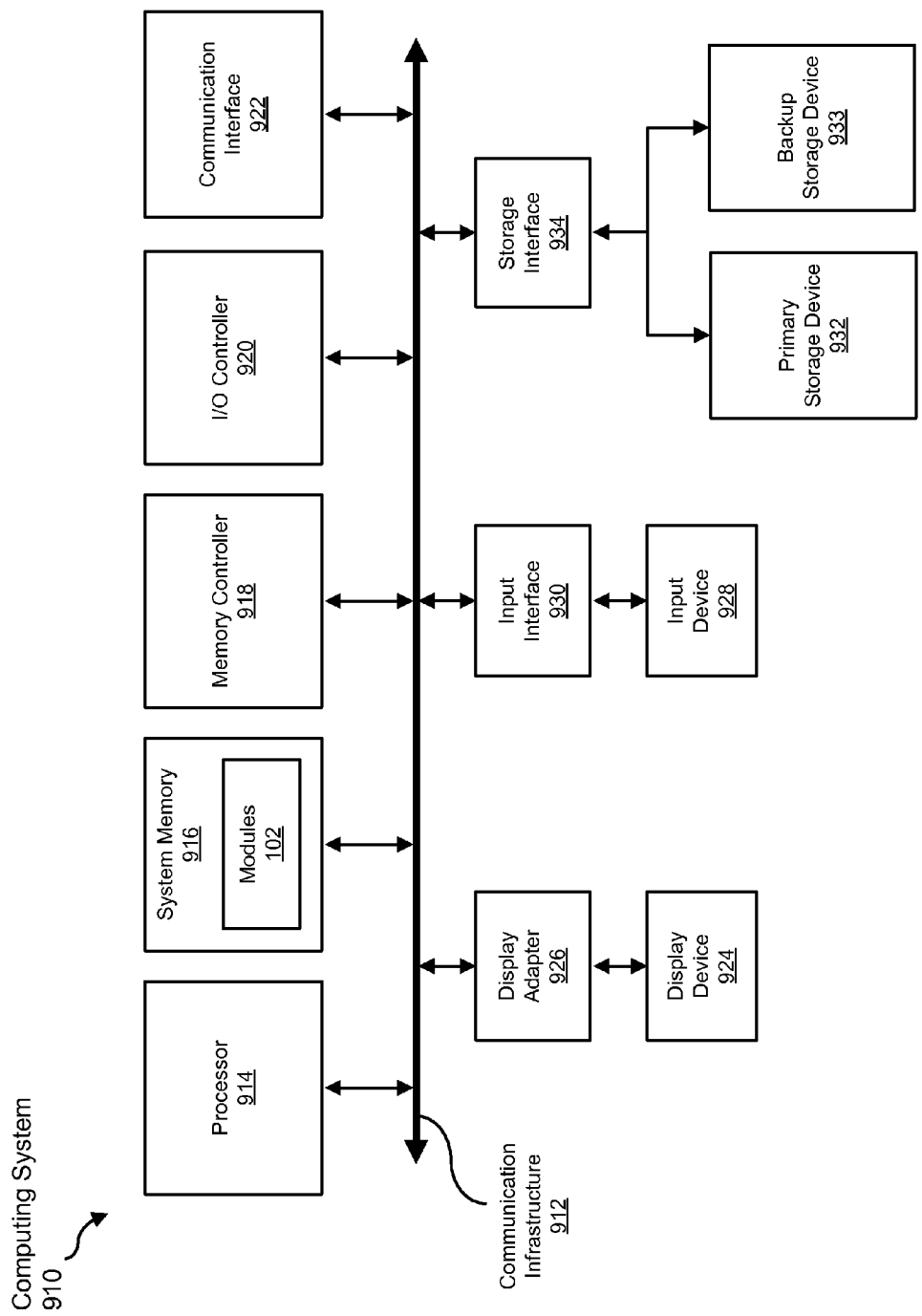
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the identifying, portraying, displaying, representing, receiving, adding, modifying, and connecting steps described herein. All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 910. All or a portion of the computer program stored on the computer-readable-storage medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

Figure 10:
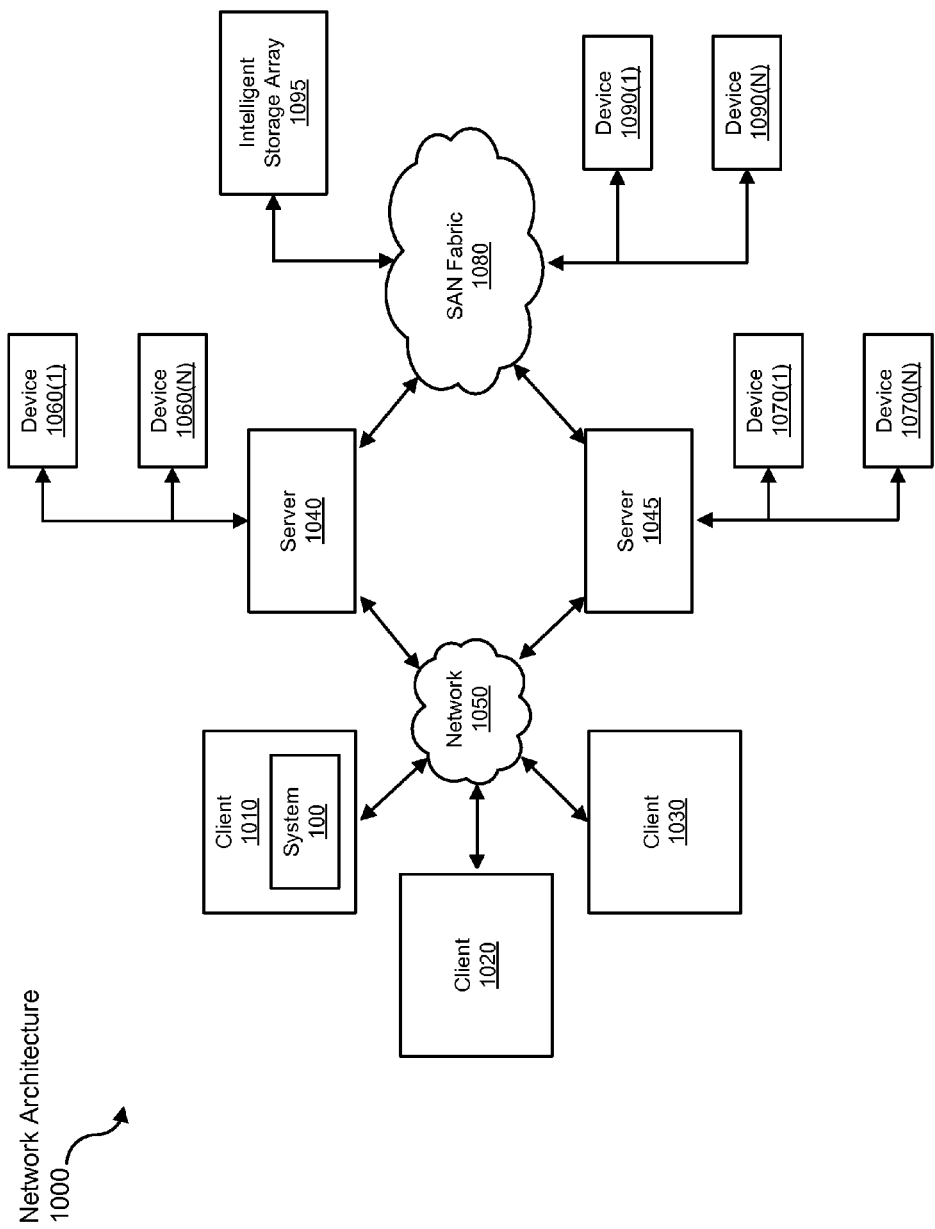
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the identifying, portraying, displaying, representing, receiving, adding, modifying, and connecting steps disclosed herein. All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network (WAN), a local area network (LAN), a personal area network (PAN), or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for providing backup interfaces.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for providing backup interfaces. As another example, one or more of the modules recited herein may transform a display device into a backup system interface.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing backup interfaces, at least a portion of the method being performed by a computing device comprising at least one processor, the method comprising:
    identifying a backup policy configured to back up data from a source system during a plurality of backup stages according to a backup configuration, wherein at least one backup operation is performed at each backup stage within the plurality of backup stages;
    identifying a request to display the backup policy within a graphical user interface; and
    in response to the request, portraying the backup policy within the graphical user interface as a flow diagram, the flow diagram comprising:
        a box representing the source system that displays an identifier of the source system;
        a plurality of boxes representing the plurality of backup stages of the backup policy, each box within the plurality of boxes:
            representing a backup stage within the plurality of backup stages; and
            displaying an identifier of at least one backup operation performed at the backup stage;
        a first directed edge connecting the box representing the source system and a first box within the plurality of boxes that indicates that a backup operation performed at the backup stage represented by the first box will be performed on the data from the source system; and
        a second directed edge connecting the first box with a second box within the plurality of boxes that indicates that:
            a backup operation performed at the backup stage represented by the second box will be performed on data created by the backup operation performed at the backup stage represented by the first box; and
            configuration details of the backup operation performed at the backup stage represented by the second box are automatically populated in response to modifications made via the first box to related configuration details of the backup operation performed at the backup stage represented by the first box.

2. The computer-implemented method of claim 1, wherein the box representing the source system further displays at least one identified selection of data to back up from the source system according to the backup policy.

3. The computer-implemented method of claim 1, wherein:
    the configuration details of the backup operation performed at the backup stage represented by the first box comprise at least one of:
        a storage target of the backup operation performed at the backup stage represented by the first box; and
        a backup schedule of the backup operation performed at the backup stage represented by the first box;

the configuration details of the backup operation performed at the backup stage represented by the second box comprises at least one of:
a storage source of the backup operation performed at the backup stage represented by the second box; and
a backup schedule of the backup operation performed at the backup stage represented by the second box.

4. The computer-implemented method of claim 1, wherein the second directed edge comprises an arrow pointing from the first box to the second box.

5. The computer-implemented method of claim 1, wherein at least one box within the plurality of boxes comprises at least one interface element for modifying at least one configuration detail of a backup operation performed at the backup stage represented by the at least one box within the plurality of boxes.

6. The computer-implemented method of claim 1, wherein at least one box within the plurality of boxes:
displays at least one configuration detail of the backup operation performed at the backup stage represented by the at least one box within the plurality of boxes;
comprises at least one interface element for modifying the configuration detail of the backup operation performed at the backup stage represented by the at least one box within the plurality of boxes.

7. The computer-implemented method of claim 1, wherein:
the plurality of backup stages comprise:
a first backup stage at which a first backup operation is applied to the data from the source system; and
a second backup stage at which a second backup operation is applied to the data created at the first backup stage;
the first box represents the first backup stage; and
the second box represents the second backup stage;
the first directed edge indicates a sequence beginning with the box representing the source system and progressing to the first box; and
the second directed edge indicates a sequence beginning with the first box and progressing to the second box.

8. The computer-implemented method of claim 7, wherein:
the plurality of backup stages further comprise a third backup stage at which a third backup operation is applied to the data created at the first backup stage;
the plurality of boxes further comprise a third box representing the third backup stage; and
the flow diagram further comprises a third directed edge connecting the first box and the third box, the third directed edge indicating a sequence beginning with the first box and progressing to the third box.

9. The computer-implemented method of claim 1, wherein at least one box within the plurality of boxes comprises an interface element for adding an additional backup stage to the backup policy, the additional backup stage being applied to data created at the backup stage represented by the box within the plurality of boxes.

10. The computer-implemented method of claim 9, further comprising:
receiving an input via the interface element;
in response to the input:
adding the additional backup stage to the backup policy; and
modifying the flow diagram to comprise:
an additional box representing the additional backup stage; and
an additional directed edge connecting the box within the plurality of boxes and the additional box, the additional directed edge indicating a sequence beginning with the box within the plurality of boxes and progressing to the additional box; and
displaying the modified flow diagram within the graphical user interface.

11. A system for providing backup interfaces, the system comprising:
an identification module programmed to:
identify a backup policy configured to back up data from a source system during a plurality of backup stages according to a backup configuration, wherein at least one backup operation is performed at each backup stage within the plurality of backup stages;
identify a request to display the backup policy within a graphical user interface;
an interface module programmed to, in response to the request, portray the backup policy within the graphical user interface as a flow diagram, the flow diagram comprising:
a box representing the source system that displays an identifier of the source system;
a plurality of boxes representing the plurality of backup stages of the backup policy, each box within the plurality of boxes:
representing a backup stage within the plurality of backup stages; and
displaying an identifier of at least one backup operation performed at the backup stage;
a first directed edge connecting the box representing the source system and a first box within the plurality of boxes that indicates that a backup operation performed at the backup stage represented by the first box will be performed on the data from the source system; and
a second directed edge connecting the first box with a second box within the plurality of boxes that indicates that:
a backup operation performed at the backup stage represented by the second box will be performed on data created by the backup operation performed at the backup stage represented by the first box; and
configuration details of the backup operation performed at the backup stage represented by the second box are automatically populated in response to modifications made via the first box to related configuration details of the backup operation performed at the backup stage represented by the first box; and
at least one processor configured to execute the identification module and the interface module.

12. The system of claim 11, wherein the box representing the source system further displays at least one identified selection of data to back up from the source system according to the backup policy.

13. The system of claim 11, wherein:
the configuration details of the backup operation performed at the backup stage represented by the first box comprise at least one of:
a storage target of the backup operation performed at the backup stage represented by the first box; and
a backup schedule of the backup operation performed at the backup stage represented by the first box;
the configuration details of the backup operation performed at the backup stage represented by the second box comprises at least one of:
a storage source of the backup operation performed at the backup stage represented by the second box; and a backup schedule of the backup operation performed at the backup stage represented by the second box.

14. The system of claim 11, wherein the second directed edge comprises an arrow pointing from the first box to the second box.

15. The system of claim 11, wherein at least one box within the plurality of boxes comprises at least one interface element for modifying at least one configuration detail of a backup operation performed at the backup stage represented by the at least one box within the plurality of boxes.

16. The system of claim 11, wherein at least one box within the plurality of boxes:
   displays at least one configuration detail of the backup operation performed at the backup stage represented by the at least one box within the plurality of boxes;
   comprises at least one interface element for modifying the configuration detail of the backup operation performed at the backup stage represented by the at least one box within the plurality of boxes.

17. The system of claim 11, wherein:
   the plurality of backup stages comprise:
      a first backup stage at which a first backup operation is applied to the source system; and
      a second backup stage at which a second backup operation is applied to data created at the first backup stage;
   the first box represents the first backup stage; and
   the second box represents the second backup stage;
   the first directed edge indicates a sequence beginning with the box representing the source system and progressing to the first box; and
   the second directed edge indicates a sequence beginning with the first box and progressing to the second box.

18. The system of claim 17, wherein:
   the plurality of backup stages further comprise a third backup stage at which a third backup operation is applied to the data created at the first backup stage;
   the plurality of boxes further comprise a third box representing the third backup stage; and
   the flow diagram further comprises a third directed edge connecting the first box and the third box, the third directed edge indicating a sequence beginning with the first box and progressing to the third box.

19. The system of claim 11, wherein at least one box within the plurality of boxes comprises an interface element for adding an additional backup stage to the backup policy, the additional backup stage being applied to data created at the backup stage represented by the box within the plurality of boxes.

20. A non-transitory computer-readable-storage medium comprising one or more computer-executable instructions that, when executed by at least one processor of a computing device, cause the computing device to:
   identify a backup policy configured to back up data from a source system during a plurality of backup stages according to a backup configuration, wherein at least one backup operation is performed at each backup stage within the plurality of backup stages;
   identify a request to display the backup policy within a graphical user interface; and
   in response to the request, portray the backup policy within the graphical user interface as a flow diagram, the flow diagram comprising:
      a box representing the source system that displays an identifier of the source system;
      a plurality of boxes representing the plurality of backup stages of the backup policy, each box within the plurality of boxes:
         representing a backup stage within the plurality of backup stages; and
         displaying an identifier of at least one backup operation performed at the backup stage;
      a first directed edge connecting the box representing the source system and a first box within the plurality of boxes that indicates that a backup operation performed at the backup stage represented by the first box will be performed on the data from the source system; and
      a second directed edge connecting the first box with a second box within the plurality of boxes that indicates that:
         a backup operation performed at the backup stage represented by the second box will be performed on data created by the backup operation performed at the backup stage represented by the first box; and
         configuration details of the backup operation performed at the backup stage represented by the second box are automatically populated in response to modifications made via the first box to related configuration details of the backup operation performed at the backup stage represented by the first box.

* * * * *